US008671090B2

(12) United States Patent
Naick et al.

(10) Patent No.: US 8,671,090 B2
(45) Date of Patent: Mar. 11, 2014

(54) WEB SERVICE FOLDER INTERFACE

(75) Inventors: Indran Naick, Cedar Park, TX (US); Jeffrey K. Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1585 days.

(21) Appl. No.: 11/846,602

(22) Filed: Aug. 29, 2007

(65) Prior Publication Data

US 2009/0063513 A1 Mar. 5, 2009

(51) Int. Cl.
*G06F 17/30* (2006.01)
(52) U.S. Cl.
USPC ........... 707/709; 707/705; 707/706; 707/707; 707/708; 707/710; 709/201; 709/203; 709/213; 709/217
(58) Field of Classification Search
USPC .......... 707/705–708, 709–710; 709/201, 203, 709/213, 217
See application file for complete search history.

(56) References Cited

U.S. PATENT DOCUMENTS

| 2003/0126136 | A1* | 7/2003 | Omoigui | 707/10 |
|---|---|---|---|---|
| 2005/0102260 | A1* | 5/2005 | Spring et al. | 707/1 |
| 2007/0106650 | A1* | 5/2007 | Moore | 707/3 |
| 2007/0162487 | A1* | 7/2007 | Frailey | 707/102 |
| 2008/0097879 | A1* | 4/2008 | Sadowski et al. | 705/35 |

* cited by examiner

*Primary Examiner* — Frantz Coby
(74) *Attorney, Agent, or Firm* — Yudell Isidore Ng Russell PLLC

(57) ABSTRACT

A method of utilizing a Web Service folder interface. A user defines a folder in a local folder directory as a Web Services enabled folder. The folder includes file data and metadata corresponding to the file data. The metadata includes a configurable Web Services type property that corresponds to a remote Web Service. The metadata also includes a configurable data handling property that includes one or more allowable file formats. When a user submits the file data to the remote Web Service by selecting an option in a pull down menu of a graphical user interface (GUI) or dropping the file data in a local output folder, the operating system (OS) sends the file data to the remote Web Service. The OS automatically converts an output file received from the remote Web Service into one of the allowable file formats and updates the local file data with the output file.

7 Claims, 3 Drawing Sheets

WEB SERVICE FOLDER INTERFACE

BACKGROUND OF THE INVENTION

1. Technical Field

The present invention relates in general to data processing and in particular to data communication by data processing systems. Still more particularly, the present invention relates to an improved method and system for data transfer utilizing a Web Service folder interface.

2. Description of the Related Art

Computer applications often require access to data from multiple sources within a network, such as the Internet. In heterogeneous environments, data is typically stored in different formats, and users can extract, manipulate, and/or distribute data in different contexts. Web Services are software systems that support interoperable machine-to-machine interaction over a network that includes data in multiple formats. Web Services are typically application programming interfaces (APIs) that a client can access over a network in order to perform requested services using a remote system.

When a client application accesses a conventional Web Service, the Web Service may require the client to use any gathered information within a customized application or to manually transcribe data to another format. For example, a client application may need to convert incoming data into a format typically used by local computer users (e.g., rich text format (RTF) documents, text files, presentations, or spreadsheets). It is thus difficult and tedious for a client application to locally manage data that the client imports from a Web Service. Conventional Web Services enable clients to connect to a web page that controls calls to the Web Service from the back end and returns data in the form of a web page or a customized local client application. However, conventional methods of providing customized local client applications lack flexibility and are costly to build.

SUMMARY OF AN EMBODIMENT

Disclosed are a method, system, and computer program product for a Web Service folder interface. A user defines a folder in a local folder directory as a Web Services enabled folder. The folder includes file data and metadata corresponding to the file data. The metadata includes a configurable Web Services type property that corresponds to a remote Web Service. The metadata also includes a configurable data handling property that includes one or more allowable file formats. When a user submits the file data to the remote Web Service by selecting an option in a pull down menu of a graphical user interface (GUI) or dropping the file data in a local output folder, the operating system (OS) sends the file data to the remote Web Service. The OS automatically converts an output file received from the remote Web Service into one of the allowable file formats and updates the local file data with the output file.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
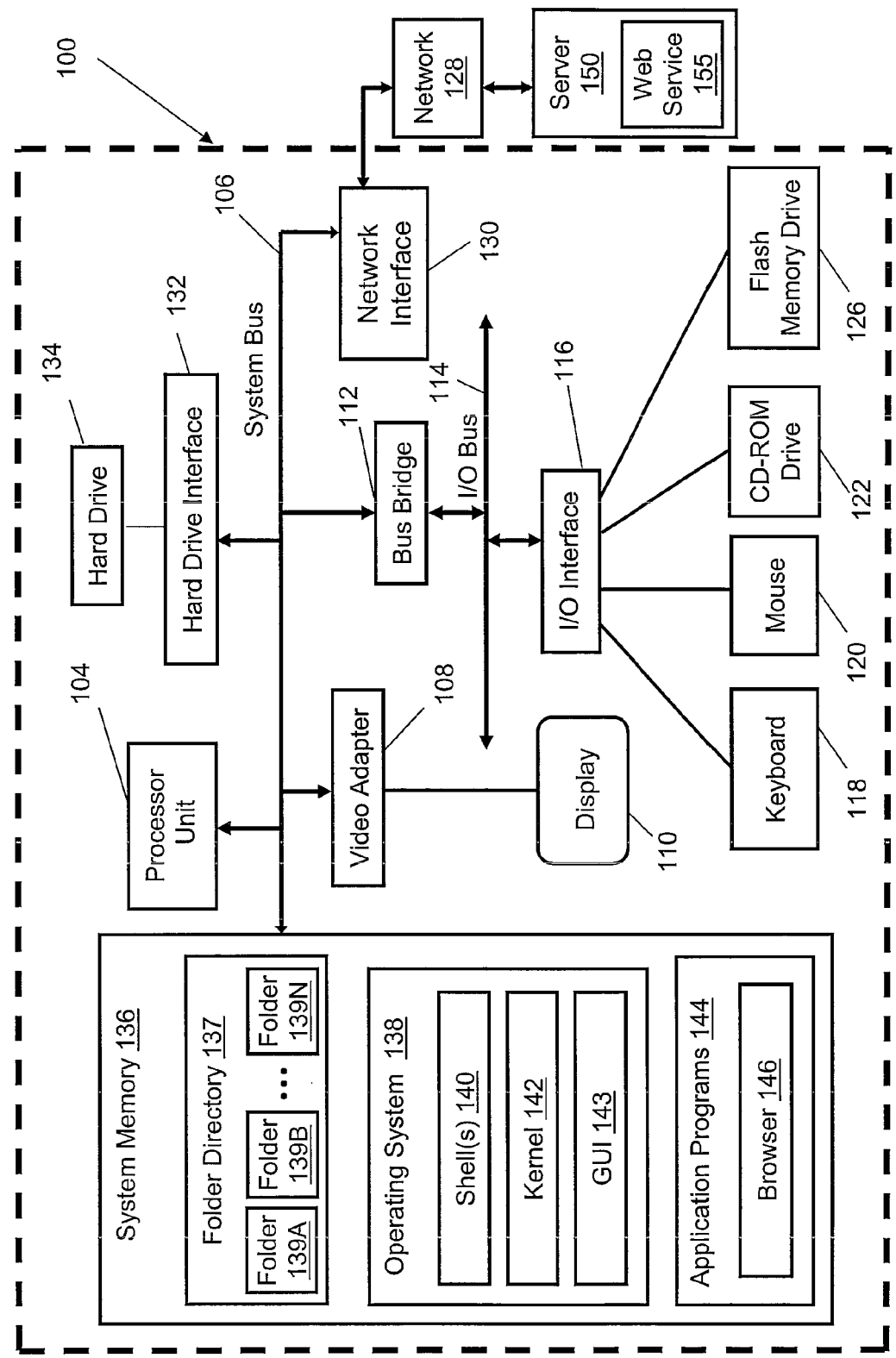
FIG. 1 depicts a high level block diagram of an exemplary computer, according to an embodiment of the present invention.

With reference now to FIG. 1, there is depicted a block diagram of an exemplary computer 100, with which the present invention may be utilized. Computer 100 includes processor unit 104 that is coupled to system bus 106. Video adapter 108, which drives/supports display 110, is also coupled to system bus 106. System bus 106 is coupled via bus bridge 112 to Input/Output (I/O) bus 114. I/O interface 116 is coupled to I/O bus 114. I/O interface 116 affords communication with various I/O devices, including keyboard 118, mouse 120, Compact Disk-Read Only Memory (CD-ROM) drive 122, and flash memory drive 126. The format of the ports connected to I/O interface 116 may be any known to those skilled in the art of computer architecture, including but not limited to Universal Serial Bus (USB) ports.

Computer 100 is able to communicate with server 150 via network 128 using network interface 130, which is coupled to system bus 106. Network 128 may be an external network such as the Internet, or an internal network such as a Local Area Network (LAN), an Ethernet, or a Virtual Private Network (VPN). In one embodiment, server 150 is configured similarly to computer 100. Server 150 includes Web Service 155. As utilized herein, a Web Service refers to a remotely located Application Programming Interface (API) that provides one or more services to a local client in computer 100 (e.g., one of application programs 144) via a network, such as network 128.

Hard drive interface 132 is also coupled to system bus 106. Hard drive interface 132 interfaces with hard drive 134. In one embodiment, hard drive 134 populates system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Data that populates system memory 136 includes Operating System (OS) 138, application programs 144, and folder directory 137. Folder directory 137 includes multiple folders 139A through 139N, where N is a positive integer. In one embodiment, folder directory 137 provides input data to Web Service 155 and receives output data from Web Service 155 via network 128. OS 138 and Web Service 155 perform the functions illustrated in FIG. 3, which is discussed below.

OS 138 includes shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes graphical user interface (GUI) 143 and kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150.

Figure 2:
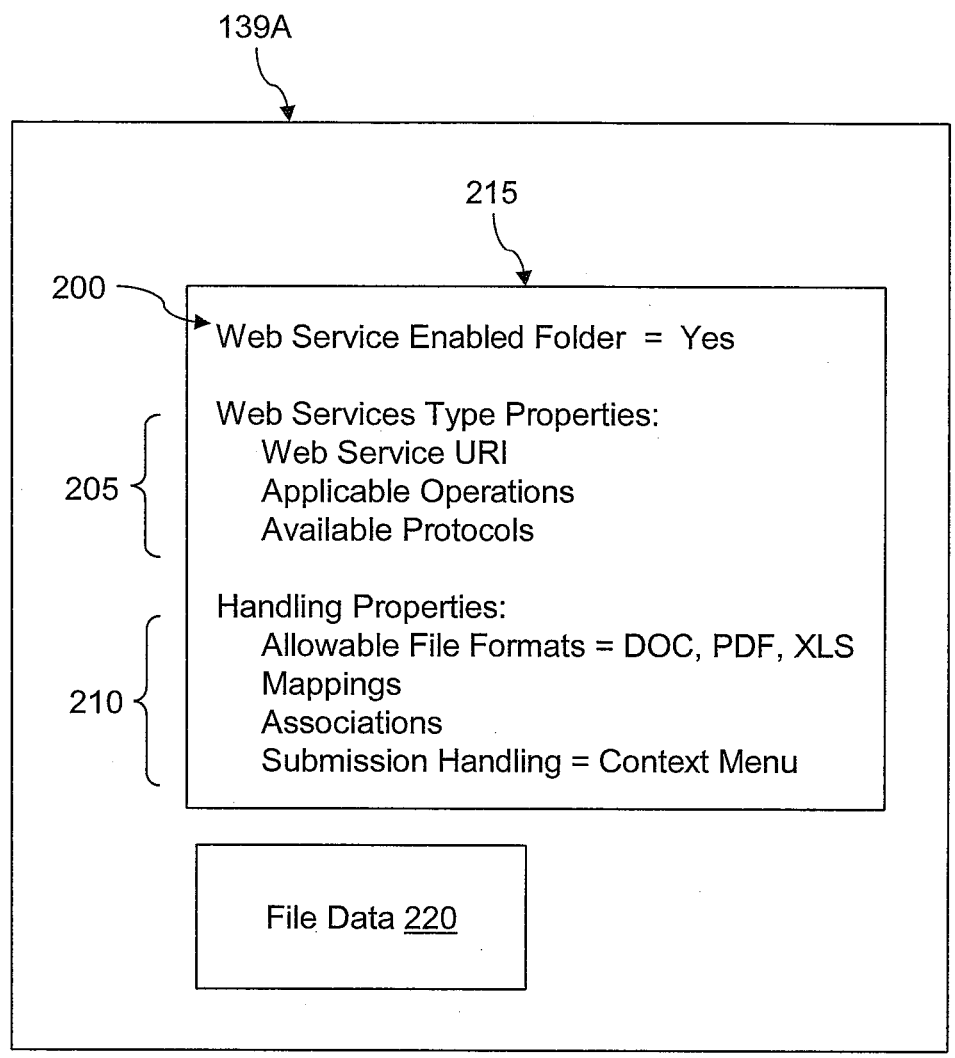
FIG. 2 illustrates an exemplary Web Services enabled folder, according to an embodiment of the present invention.

With reference now to FIG. 2, there is depicted the contents of an exemplary Web Services enabled folder, according to an embodiment of the present invention. As shown, folder 139A (FIG. 1) includes both file data 220 and metadata 215 that corresponds to file data 220. File data 220 may include text files, image files, and or other documents stored within folder 139A. Metadata 215 includes a Web Services enabled folder option 200, multiple Web Services type properties 205, multiple data handling properties 210. In one embodiment, a user of computer 100 may use a yes/no toggle button provided by GUI 143 to define whether or not a folder, such as folder 139A, is Web Services enabled. In another embodiment, a user of computer 100 may define folder 139A as being Web Services enabled using a pull down menu in one of application programs 144, such as browser 146.

According to the illustrative embodiment, Web Services type properties 205 may include a Uniform Resource Identifier (URI) that corresponds to the location of a Web Service, such as Web Service 155. Web Service type properties 205 may also include one or more applicable operations (e.g., viewing, printing, and emailing) and protocols (e.g., HTML and extensible markup language (XML)) that apply to file data 220. Similarly, Web Service handling properties 210 includes a listing of one or more allowable data formats (e.g., word processor documents, spreadsheet files, and portable document format (PDF) files) for file data 220 within folder 139A. All file data 220 within folder 139A must comply with one of the listed data formats. Accordingly, in one embodiment, files stored within a folder of folder directory 137 are automatically converted to a pre-defined data format using mappings and/or associations between files and schema definitions stored within the folder.

According to the illustrative embodiment, Web Service handling properties 210 also include a user-defined submission handling option, such as "Context Menu" or "Save and Drag". If a user selects the "Context Menu" submission handling option, the user may submit a file within the folder to a Web Service, such as Web Service 155, by right clicking on a file of input data in the folder and selecting an option from a pull down menu (e.g., "Submit Input File"). OS 138 would subsequently pass the input file to Web Service 155. If a user selects the "Save and Drag" submission handling option, the user may submit an input file to a Web Service by saving the document and then using a mouse to drag the document to a local output folder in folder directory 137 that corresponds to the desired Web Service (e.g., Web Service 155).

Figure 3:
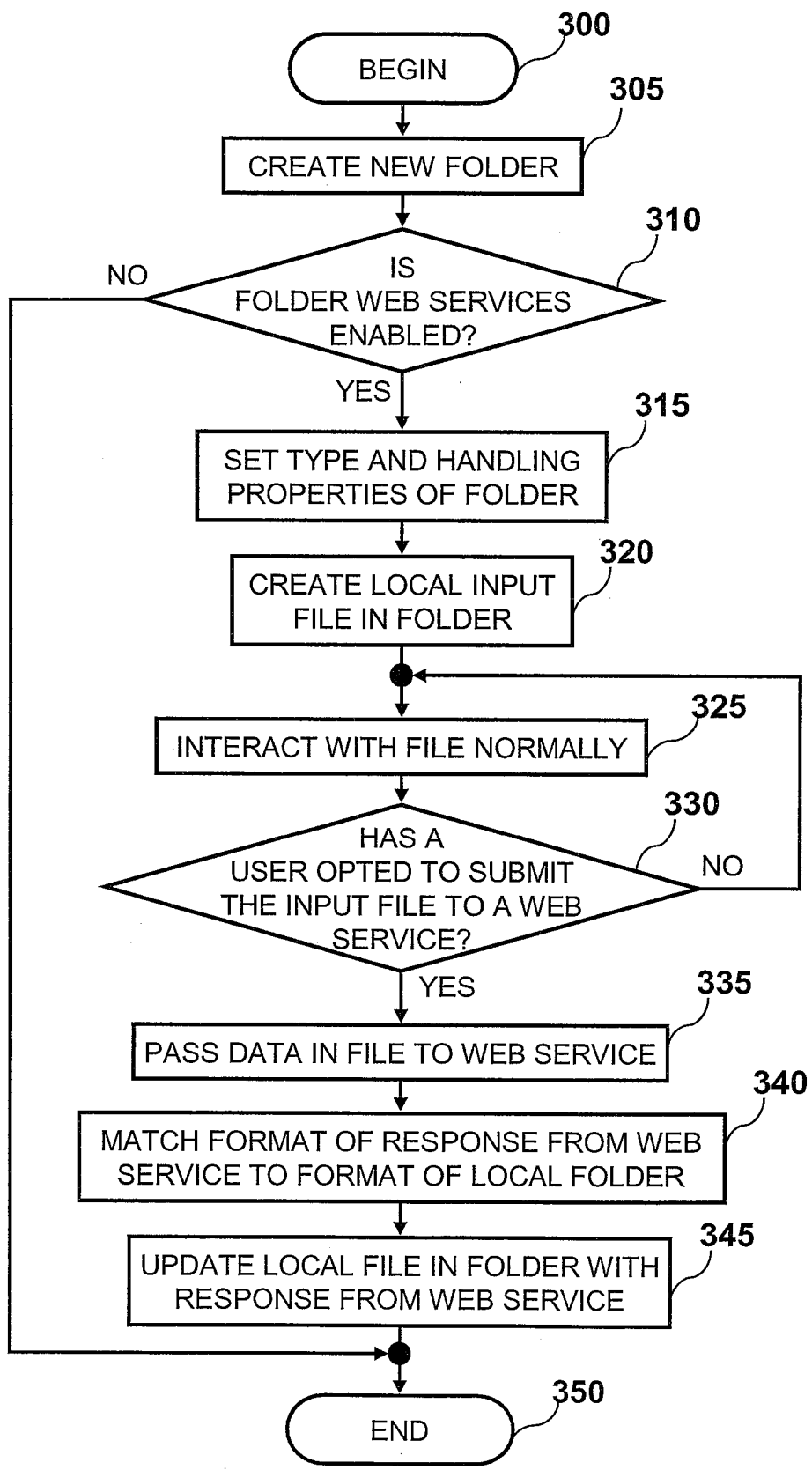
FIG. 3 is a high level logical flowchart of an exemplary method of utilizing a Web Service folder interface, according to an embodiment of the invention.

Turning now to FIG. 3, there is illustrated a high level logical flowchart of an exemplary method of utilizing a Web Service folder interface, according to an embodiment of the invention. The process begins at block 300 in response to a user of computer 100 (FIG. 1) accessing folder directory 137, for example via GUI 143. A user of computer 100 creates a new folder within folder directory 137, as depicted in block 305, and the process proceeds to block 310. In another embodiment, a user may instead choose to select an existing folder in folder directory 137, and the process proceeds directly from block 300 to block 310.

At block 310, OS 138 determines whether or not a user has selected Web Services enabled folder option 200 (FIG. 2) to define the active folder (i.e., the folder created or currently selected by the user) as a Web Services enabled folder. If the user has not defined the active folder as a Web Services enabled folder, the process terminates at block 350. If the user has defined the active folder as a Web Services enabled folder, the user defines one or more Web Services type properties 205 and/or handling properties 210 using a pull down menu in the active folder, as shown in block 315.

In an alternate embodiment, the user may define one or more Web Services type properties 205 and/or handling properties 210 using GUI 143. In another embodiment, a user may use GUI 143 to define a folder as a Web Services enabled folder.

According to the illustrative embodiment, a user of computer 100 creates file data 220 (e.g., a spreadsheet file) within the Web Services enabled folder, as depicted in block 320. The user subsequently interacts with file data 220 normally (i.e., the user performs applicable operations), as shown in block 325. As described above, applicable operations may include, but are not limited to, viewing, printing, editing, saving, and emailing file data 220.

At block 330, OS 138 determines whether or not a user of computer 100 has opted to submit an input file to a Web Service based on the user-defined submission handling option stored in handling properties 210. For example, if the submission handling option of the folder that includes the input file is set to "Context Menu", OS 138 determines whether a user has selected the "Submit Input File" menu option. If the submission handling option of the folder that includes the input file is set to "Save and Drag", OS 138 determines whether a user has dragged the input file to a local output folder corresponding to a Web Service.

If the user has not opted to submit an input file to a Web Service, the process returns to block 325 and the user continues to interact normally with the local file. Once the user opts to submit the input file to a Web Service, OS 138 passes the input file to the Web Service selected by the user (e.g., Web Service 155) via network interface 130, as depicted in block 335. Web Service 155 subsequently performs one or more pre-defined operations on the input file at a remote location (i.e., server 150) and produces an output file. The file format of the output file may not match the file format of the local Web Services enabled folder.

OS 138 receives the output file via network interface 130 and automatically converts the output file to one of the user-defined allowable file formats using the mappings and/or associations stored within handling properties 210, as shown in block 340. Once the output file matches a file format compatible with the local Web Services enabled folder, OS 138 updates the local input file in the Web Services enabled folder with the output file, as depicted in block 345, and the process terminates at block 350. In another embodiment, OS 138 may place the output file in a separate local output folder in folder directory 137 rather than updating the input file.

The present invention thus provides a method of utilizing a Web Service folder interface. A user of computer 100 (FIG. 1) defines a folder in folder directory 137 as a Web Services enabled folder. The folder includes file data 220 (FIG. 2) and metadata 215 corresponding to file data 220. Metadata 215 includes configurable Web Services type properties 205 that correspond to a remote Web Service 155. Metadata 215 also includes configurable data handling properties 210 that include one or more allowable file formats. When a user submits file data 220 to the remote Web Service 155 by selecting an option in a pull down menu of GUI 143 or dropping file data 220 in a local output folder, OS 138 sends file data 220 to the remote Web Service 155. OS 138 automatically converts an output file received from the remote Web Service 155 into one of the allowable file formats and updates the local file data 220 with the output file.

It is understood that the use herein of specific names are for example only and not meant to imply any limitations on the invention. The invention may thus be implemented with different nomenclature/terminology and associated functionality utilized to describe the above devices/utility, etc., without limitation.

In the flow chart (FIG. 3) above, while the process steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as thumb drives, floppy disks, hard drives, CD ROMs, DVDs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. In a computer system, a method comprising:
   a computer system defining a folder in a local folder directory as a Web Services enabled folder, wherein said defining includes defining for the Web Services enabled folder metadata including:
      a configurable Web Services type property that identifies a remote Web Service; and
      a configurable data handling property that specifies one or more allowable file formats of files contained within the Web Services enabled folder; and
   in response to the computer system receiving a command to submit file data of a file contained in the Web Services enabled folder to said remote Web Service:
      the computer system sending said file data to said remote Web Service; and
      the computer system converting an output file received from said remote Web Service into one of said one or more allowable file formats based on said configurable data handling property.

2. The method of claim 1, and further comprising the computer system receiving said command to submit said file data to said remote Web Service via selection of an option in a pull down menu of a graphical user interface (GUI) of the computer system.

3. The method of claim 1, and further comprising the computer system receiving said command to submit said file data to said remote Web Service by placement of said file in a local output folder in said local folder directory.

4. The method of claim 1, and further comprising storing said output file in said computer system.

5. A computer system comprising:
   a processor unit;
   a network interface coupled to said processor unit;
   data storage coupled to said processor unit;
   a local folder directory within said system memory that includes a plurality of folders; and
   an operating system in said data storage that performs the functions of:
      defining a folder in said local folder directory as a Web Services enabled folder by defining for the Web Service enabled folder metadata including:
         a configurable Web Services type property that identifies a remote Web Service of files contained within the Web Services enabled folder; and
         a configurable data handling property that specifies one or more allowable file formats; and
      in response to a command to submit said file data of a file contained in the Web Services enabled folder to said remote Web Service:
         sending said file data to said remote Web Service; and
         converting an output file received from said remote Web Service into one of said one or more allowable file formats based on said configurable data handling property.

6. The computer system of claim 5, and further comprising a display in which the operating system presents a graphical user interface, wherein said command to submit said file data to said remote Web Service further comprises selection of an option in a pull down menu of the graphical user interface.

7. A computer program product comprising:
   a computer storage medium; and
   program code stored on said computer storage medium that, when executed by a computer system, provides the functions of:
      the computer system defining a folder in a local folder directory as a Web Services enabled folder, wherein said defining includes defining for the Web Services enabled folder metadata including:
         a configurable Web Services type property that identifies a remote Web Service; and
      a configurable data handling property that specifies one or more allowable file formats of files contained within the Web Services enabled folder; and
      in response to the computer system receiving a command to submit file data of a file contained in the Web Services enabled folder to said remote Web Service:
         the computer system sending said file data to said remote Web Service; and
      the computer system converting an output file received from said remote Web Service into one of said one or more allowable file formats based on said configurable data handling property.

* * * * *